A. J. FRENCH, S. A. McKELVY & J. W. SCROGGS.
MUSICAL CHART.
APPLICATION FILED SEPT. 29, 1910.

1,017,045.

Patented Feb. 13, 1912.

3 SHEETS—SHEET 1.

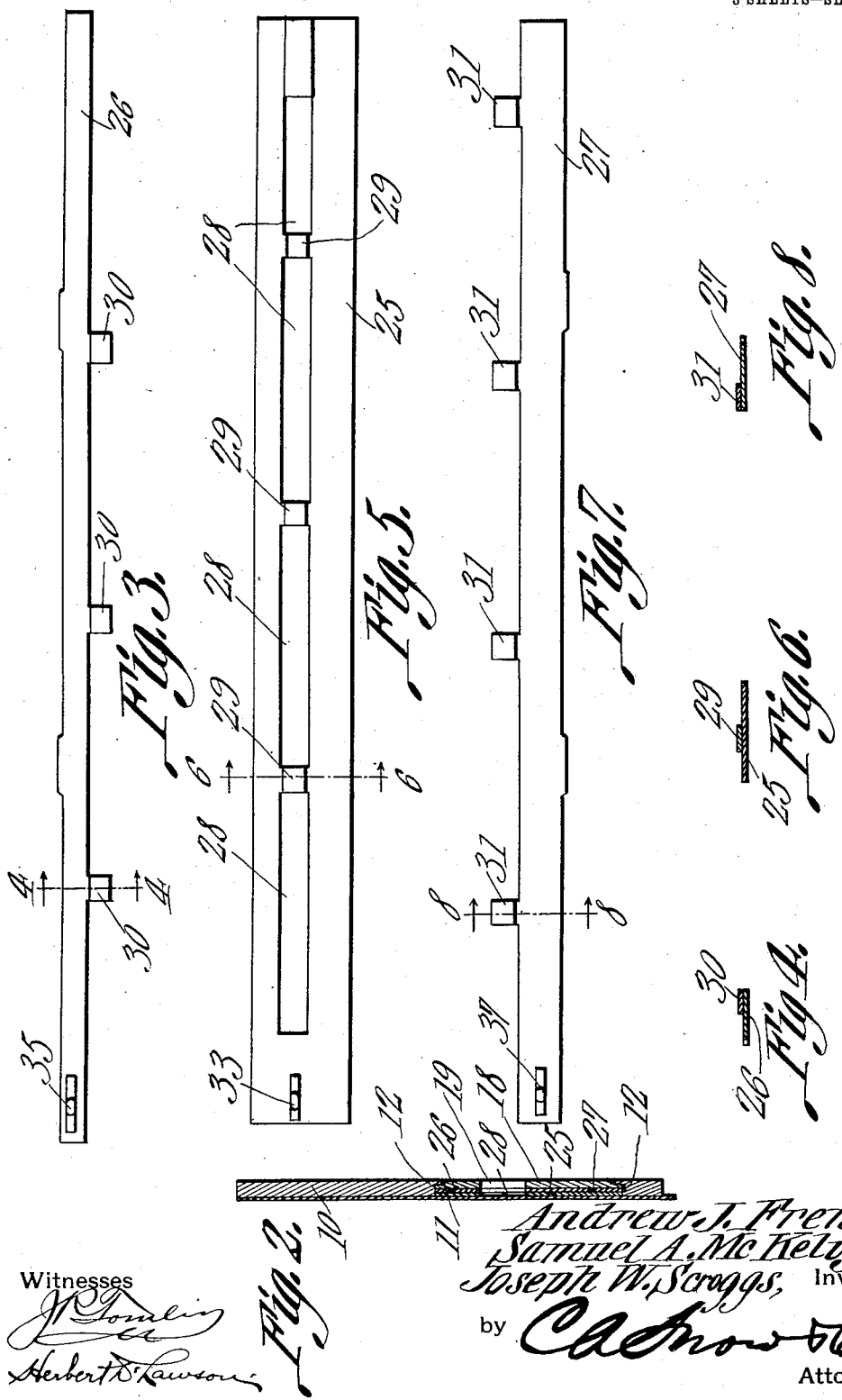

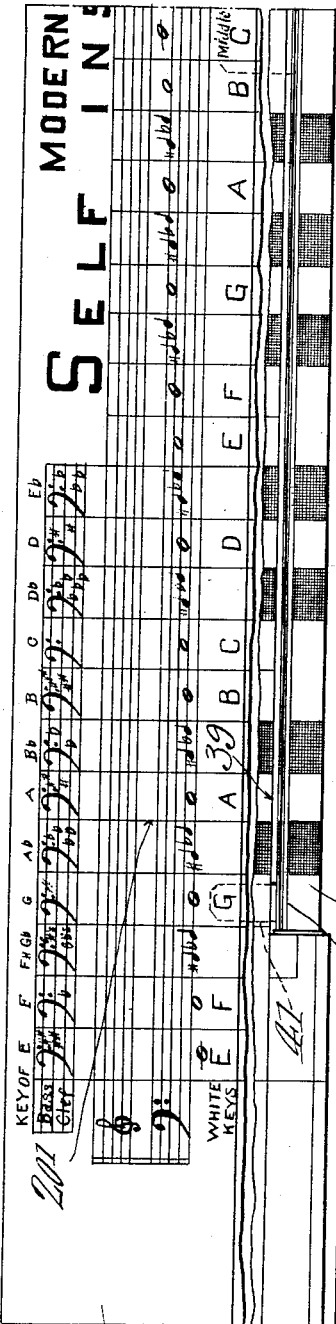
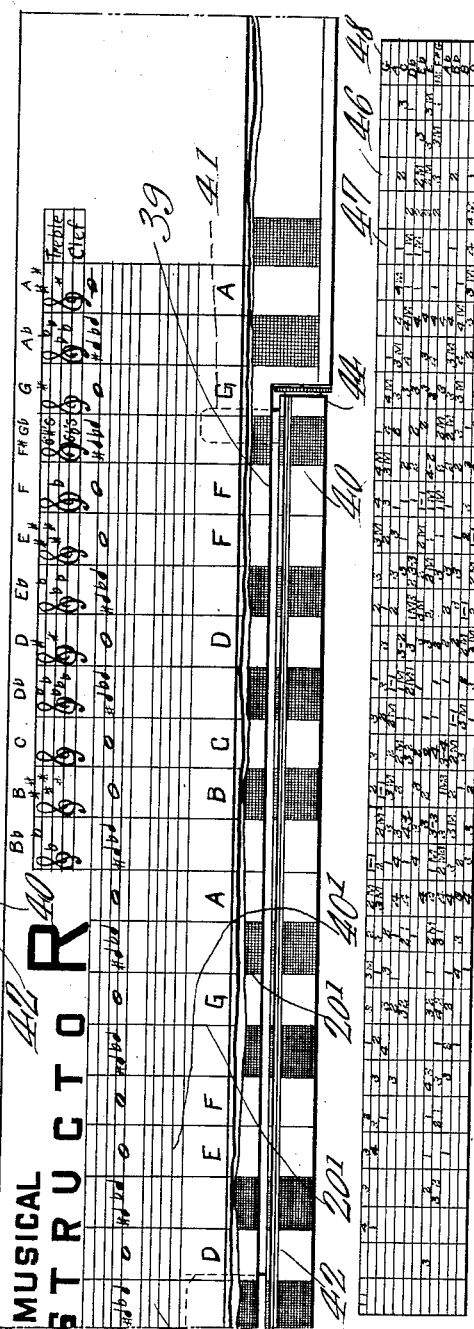
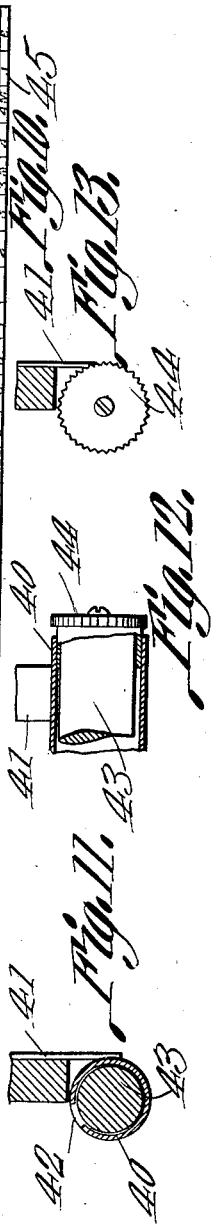

UNITED STATES PATENT OFFICE.

ANDREW J. FRENCH, OF PURCELL, SAMUEL A. McKELVY, OF McCLOUD, AND JOSEPH W. SCROGGS, OF KINGFISHER, OKLAHOMA.

MUSICAL CHART.

1,017,045.  Specification of Letters Patent.  Patented Feb. 13, 1912.

Application filed September 29, 1910. Serial No. 584,580.

*To all whom it may concern:*

Be it known that we, ANDREW J. FRENCH, SAMUEL A. McKELVY, and JOSEPH W. SCROGGS, citizens of the United States, residing, respectively, at Purcell, McCloud, and Kingfisher, in the counties of McClain, Pottawatomie, and Kingfisher, State of Oklahoma, have invented a new and useful Musical Chart, of which the following is a specification.

This invention relates to charts particularly designed for use in self instruction in music the object of the invention being to provide a simple form of chart having columns thereon corresponding with the middle keys of a piano, means being provided in connection with these columns for indicating the positions upon the great staff of all of the notes designated by the respective columns.

A further object is to provide a movable scale for use in connection with the main portion of the chart, said scale having parts adjustably mounted thereon, whereby the indicating letters of the various columns of the chart may be exposed in predetermined relations to indicate the different scales such as the major scale and the natural, harmonic and melodic minor scales.

A further object is to so mount the adjustable slide as to enable the various scales to be indicated in any key desired.

A still further object is to provide means whereby the various major and minor chords in any key will be accurately indicated and can be readily followed by a student.

With the foregoing and other objects in view the invention consists of certain novel details of construction and combinations of parts hereinafter more fully described and pointed out in the claims.

In the accompanying drawings the preferred form of the invention has been shown.

In said drawings:—Figure 1 is a plan view of one-half of the complete chart, the said chart being arranged to indicate the key of C. Fig. 1ᴬ is a plan view of the other half of the chart. Fig. 2 is a section on line 2—2 Fig. 1. Fig. 3 is a plan view of one of the adjustable side slides carried by the movable scale. Fig. 4 is a section on line 4—4 of Fig. 3. Fig. 5 is a plan view of the base slide of the movable scale. Fig. 6 is a section on line 6—6 Fig. 5. Fig. 7 is a plan view of the other side slide of the scale. Fig. 8 is a section on line 8—8 of Fig. 7. Fig. 9 is a plan view of one-half of a modified form of chart having an attachment thereon for indicating the fingering of all the scales, said chart being broken away longitudinally. Fig. 9ᵃ is a view similar to Fig. 9 and showing the other half of the chart and attachment. Fig. 10 is a plan view of the chart adapted to be affixed to the roll in the fingering attachment. Fig. 11 is a central transverse section through the fingering attachment. Fig. 12 is a longitudinal section through one end portion of said attachment. Fig. 13 is an end elevation of the attachment.

Referring to the figures by characters of reference 10 designates the chart body, the same being formed with a longitudinal channel 11 extending throughout the length thereof and having its walls under-cut or rabbeted as indicated at 12 in Fig. 2. This chart body has a series of columns 13 extending parallel with the sides of the body and intersecting a great staff 14 which is printed or otherwise indicated on the chart body and extends longitudinally thereof. Each of the columns 13 corresponds with one of the keys of the keyboard of a piano, and those portions of the columns between the channel 11 and the lower edge of the chart body are made black and white, so as to correspond with the black and white keys of the keyboard. Characters indicating all of the notes of the chromatic scale are arranged upon the face at the back or bottom of the channel 11 and in proper succession within the respective columns 13, these characters running from E below the bass clef to A above the treble clef. This row of characters has been indicated at 15. Letters indicating the white keys of the keyboard are placed in the proper columns 13 along the chart body and close to the upper edge of the channel 11, these letters being indicated by the words "White keys". The word "Middle" is arranged above the middle C on the chart body where found in the line indicated by the words "White keys" and an arrow is preferably indicated upon the lower end portion of the column designated by "Middle C". Each column 13 has a note therein in its proper position upon the great staff 14 and those of the columns belonging to the octave beginning with low E are extended upwardly so as to intersect a bass clef 16, on which are arranged the signatures of the various keys. Those columns belonging to the octave descending from high A intersect a treble clef 17 arranged along the upper edge portion of the chart body and having the signatures of the different keys arranged in the proper columns.

A movable scale 18 is slidably mounted within the channel 11 and is retained in the said channel by the rabbeted portion 12. The slide 18 has a series of alining slots 19 extending the whole length of the scale on the slide, said slots being so separated that when the parts of the chart are in their normal positions relative to each other, the characters C sharp and D flat, and F sharp and G flat, of the series or row 15 will be concealed, thus leaving exposed ten characters of the chromatic scale.

Columns 20 are indicated on the movable scale 18 and are adapted to register with the columns 13, these columns being provided, below the slots 19, with the syllables and numbers of the major scale while arranged in the columns and above the slots 19, are syllables readable in connection with the data on the adjustable slides to indicate the minor scales. For example, when one of the slides is moved so as to change the major third to a minor third the melodic minor scale would be indicated whereas, by moving the other slides the harmonic and natural minor scales would be indicated.

The upper portions of the columns 20 on the moving scale are intersected by parallel lines respectively designated by the sub-headings "Dominant", "Sub-dominant" and "Tonic", these sub-headings being arranged adjacent the main heading "Minor chords". These main and sub-headings are located at the left ends of the lines, while the right ends of said lines are designated by the headings "Melodic minor scale", "Harmonic minor scale", and "Natural minor scale". The heading "Minor scale" is arranged in alinement with the syllables of the minor scale heretofore referred to. The notes constituting the dominant chord are indicated by coloring the proper columns above the line designated by the word "Dominant", and as indicated at 21. The notes constituting the sub-dominant minor chord are indicated by coloring those portions of the proper columns indicated by the line having the sub-heading "Sub-dominant" and as indicated at 22. The notes constituting the minor tonic chord are indicated by coloring those portions of the proper columns located adjacent the line having the sub-heading "Tonic", and as indicated at 23. It is to be understood of course that the different chords are differently colored so that they may be readily distinguished.

The notes of the melodic minor scale are indicated by numerals arranged in proper succession, above the upper line of the aforesaid parallel chord and minor scale lines. The notes of the harmonic minor scale are indicated by numerals arranged in proper succession adjacent the intermediate line of the said lines, while the notes constituting the natural minor scale are indicated by numerals arranged in proper succession upon the lower line of the said lines. This arrangement has been clearly indicated in Fig. 1^A. The lower portions of the columns 20 on the movable scale are intersected by a series of parallel lines 24 indicated, respectively, by the heading "Major chords", and by the sub-headings "Tonic", "Sub-dominant" and "Dominant". See Fig. 1^A. The notes constituting the major tonic chord are indicated by coloring those portions of the proper columns located directly above the line indicated by the word "Tonic". Those notes constituting the major sub-dominant chord are designated by coloring the proper columns at points above the line having the heading "Sub-dominant". The notes constituting the dominant chord are designated by coloring the proper columns at points above the line having the heading "Dominant". Since the slot 19 with its intersecting portions exposes ten characters of the chromatic scale, additional slides are required with parts to conceal three of the characters so as to leave only seven to the octave.

A series of three subordinate slides, designated by the numerals 25, 26 and 27 has, therefore, been interposed between the movable scale 18 and the bottom or back of the channel 11, the slide 25 being under the slides 26 and 27 and all of said slides being extended throughout the length of the chart. The bottom or back slide 25 has a series of alining slots 28 therein and separated by cut-off strips 29, each of which is thickened so that it will rest within one of the slots 19 and with its upper face flush with the upper face of the moving scale 18. These cut-off strips 29 are so arranged that, when the chart is set to indicate the key of C said cut-offs will lie within the E♭ columns and thus conceal the characters D♯ and E♭ arranged on the bottom of the channel 11. The upper slide 26 has ears 30 extending laterally therefrom and across the slots 28, these ears being thickened and elevated so as to rest within the slots 19. The said ears are so located that, when the chart is set to indicate the key of C, they will lie within the columns designated by the character B♭, thus concealing the characters A♯ and B♭ arranged on the bottom of the channel 11.

The lower slide 27 has laterally extending ears 31 which are thickened and elevated above the slide 27 so as to rest within the slots 19. These ears are so positioned that, when the chart is set to indicate the key of C they will rest within the columns indicated by the characters A♭, thus concealing the characters A♭ and B♯ arranged on the bottom of the channel 11.

A knob 32 is secured to the right end portion of the movable scale 18 so that said scale can be held against movement relative to the body of the chart during the adjustment of the slides 25, 26 and 27. Slide 25 has a knob 33 at its left end which is slidably mounted within a slot 34 in the scale 18. Another knob 35 extends from the upper slide 26 and projects through a slot 36 formed within the scale 18. A knob 37 extends from the lower slide 27 and through a slot 38 in the scale 18. Slot 36 has the numeral 1 at its left end and the numeral 3 at its right end, while slot 34 has the numeral 1 at its left end and the numeral 2 at its right end.

The numeral 1 is located at the left end of the slot 28 and the numeral 4 is located at the right end thereof. The heading "Major scale" is arranged upon the scale 18 and adjacent the slot and the numerals 1, 1, 1 are placed beside this heading. The main heading "Minor scales" is also arranged on the scale 18 and located thereunder are subheadings "Natural 3. 2. 4." "Harmonic 1. 2. 4." and "Melodic 1. 2. 1."

The knobs 33, 35 and 37 are so positioned that when they are moved toward the numeral 1 in slots 34, 36 and 38, only the characters indicating the notes of the major scale will appear through the slots 19 and between the cut-offs 29, 30 and 31. In other words the heading "Major scales 1. 1. 1." constitutes directions showing that when the knobs are moved to the three numerals 1, 1, 1, the major scale will be indicated through the slots 19. By then shifting the scale 18 so as to bring the syllable "do" in the column with middle C, the proper keys to be depressed or played in the key of C will be accurately indicated. By shifting the syllable "do" so as to bring it into any one of the remaining columns, the proper notes to be played in any key will be accurately indicated. Should it be desired to play the natural minor scale, the knob 36 is shifted to the numeral 3, the knob 33 is shifted to the numeral 2 and the knob 37 is shifted to the numeral 4. All three of the slides 25, 26 and 27 will thus be moved to the right and cover the characters appearing in E, A and B columns. The notes of the natural minor scale will thus appear and by shifting the scale 18 after the parts have thus been adjusted, said natural minor scale can be indicated in any desired key. In order to indicate the harmonic minor scale, the knob 35 is shifted to the numeral 1, the knob 33 to the numeral 2, and the knob 37 to the numeral 4. To indicate the melodic minor scale, the knobs 35 and 37 are shifted toward the numeral 1, while the knob 33 is shifted toward the numeral 2. After the slides have been adjusted in any of these ways so as to indicate any scale desired, the scale 18 can be moved within the channel 11 so as to indicate the selected minor scale in any predetermined key. The various major and minor chords indicated by the colored spaces, can be transposed to different keys by shifting the scale 18.

In Figs. 9 and 9ᵃ a modified form of chart has been shown, this chart being provided with an attachement whereby the proper fingering in all of the keys may be accurately indicated. The chart structure shown in these figures is similar in all respects to the structure shown in Figs. 1 and 1ᴬ, the only difference being the provision of an elongated recess or cut away portion 39 extending along three octaves of the chart and within the lower edge portion of said chart. Within this recess is seated a tubular casing 40 which may be attached to the back of the chart in any preferred manner, as by means of tongues 41 glued or otherwise affixed thereto. This casing has a longitudinal slot 42 extending throughout the length thereof and close to the exposed face of the chart. The outer face of this casing 40 has annular stripes, preferably black and white, which correspond with the keys of the keyboard and with the lower ends of the columns 20'.

A roll 43 is mounted to rotate within the casing 40 and is provided at one end with a knob 44 or the like whereby it can be conveniently rotated. A chart 45 of paper or the like is glued or otherwise attached to the surface of the roll 43 and extends throughout the length thereof, this chart being divided into columns 46 each of which is adapted to register with one of the columns 40' belonging to the three middle octaves of the chart. Said columns 46 are intersected by parallel lines 47 which form twelve spaces in each column, the corresponding spaces of all of the columns being designated by a key indicating character located at one end of the chart. As shown in Fig. 10, these characters, designated at 48, indicate all of the keys, the same being readable downwardly from G to E. Arranged in the spaces designated by the letter G are numerals and letters adapted to be simultaneously exposed through the slots 42 when the letter G is brought into position back of said slot. These numerals appear in the columns corresponding with the keys to be depressed when playing in the key of G, the numerals indicating the fingers to be used. Certain of the figures are black and indicate the fingering of the major scale and part of the minor scale. Where the fingering of the minor scale differs from that of the major scale such difference is indicated by figures of another color and which, in Fig. 10, have been indicated by dotted lines. Where the same fingering is used in both the major and minor scales, the finger is indicated by a single black figure except that in the melodic minor scale the fingering of the 6th and 7th of the scale is indicated by the letter M in red after the figure. Where both a red and a black figure occur in the same space, it denotes that the fingering of the key indicated by that space is different in major and minor scales, the red figure indicating the minor and the black figure the major.

It will be seen that by providing a chart such as has been shown in Figs. 9 to 13, the proper fingering of all the major and minor scales can be quickly determined.

What is claimed is:—

1. A music chart including a body having columns thereon corresponding with the keys of a key-board, each of said columns being provided with a note of the staff and a character, a slidable member mounted on the body and having columns adapted to register with the columns on the body, said member having characters corresponding with the characters in the columns on the body, the said columns on the slidable member having means for exposing the notes constituting a predetermined chord and slides carried by the slidable member and separately movable to conceal certain of the characters on the slidable member and to expose those characters designating the notes of a predetermined scale.

2. A music chart including a body having key-indicating columns and a staff intersected by the columns, each column being provided with a note on the staff and with a character, a longitudinally slotted member slidable on the body, separate slides mounted on said member, and concealing devices carried by the slides and arranged in alinement, said member and concealing devices coöperating to select the notes in the columns to make up a predetermined scale.

3. A music chart including a body having key indicating columns thereon and a staff intersected by the columns, each column being provided with a note upon the staff and with a character, a slotted member slidably mounted on the body and normally concealing certain of the characters thereon, and separately movable slides coöperating with said slidable member and having portions adapted to conceal certain of the characters in the columns, said slides being shiftable relative to the slidable member to expose the characters forming a predetermined scale, said member and slides being movable together to indicate the selected scale in a predetermined key.

4. A music chart including a body having columns adapted to register with the keys of a piano keyboard and designated by characters indicating the tones of the chromatic scale, and separate means having portions for concealing all of said characters but those of a predetermined major scale, said means being movable relative to each other and to the body to expose characters indicating the change from major sixths and sevenths to minor sixths and sevenths.

5. A music chart including a body having columns adapted to register with the keys of a piano keyboard and designated by characters indicating the notes of the chromatic scale, and separate means having portions for concealing all of said characters but those of a predetermined major scale, said means being movable independently relative to each other and to the body to expose characters indicating the change from major thirds, sixths and sevenths to minor thirds, sixths and sevenths.

6. A music chart including a body having columns adapted to register with the keys of a piano keyboard and designated by a single row of characters indicating the notes of the chromatic scale, and separately movable slides on the body and each having an open portion extending throughout the length of the series of characters, there being portions on the slides and intersecting said open portions for concealing all but seven characters to the octave.

In testimony that we claim the foregoing as our own, we have hereto affixed our signatures in the presence of two witnesses.

ANDREW J. FRENCH.
SAMUEL A. McKELVY.
JOSEPH W. SCROGGS.

Witnesses:
J. LANE,
J. M. HATCHER.

Copies of this patent may be obtained for five cents each, by addressing the "Commissioner of Patents, Washington, D. C."